United States Patent [19]

Lumby

[11] 4,213,718

[45] Jul. 22, 1980

[54] STRUT ROD MOUNTING ASSEMBLY

[75] Inventor: Dale Lumby, Hudson, Ohio

[73] Assignee: TRW Inc., Cleveland, Ohio

[21] Appl. No.: 51,279

[22] Filed: Jun. 22, 1979

[51] Int. Cl.² ............................................. F16B 9/02
[52] U.S. Cl. .................................. 403/197; 403/221;
267/141.3; 248/635; 85/50 R
[58] Field of Search ............... 403/197, 247, 259, 243,
403/220, 221, 227, 228; 248/56, 635; 85/1 JP,
50 R; 267/141, 141.1, 141.3

[56] References Cited

U.S. PATENT DOCUMENTS

| | | | |
|---|---|---|---|
| 1,920,436 | 8/1933 | Riker | 267/141.1 |
| 2,294,904 | 9/1942 | Hewitt | 248/635 |
| 2,353,945 | 7/1944 | Storch | 267/141.3 |
| 2,379,763 | 7/1945 | Sweet et al. | 248/635 |
| 2,678,585 | 5/1954 | Ellis | 85/50 R |
| 3,608,851 | 9/1971 | Anderson | 248/635 |
| 4,145,800 | 5/1979 | Scholz et al. | 85/1 JP |

FOREIGN PATENT DOCUMENTS

| | | | |
|---|---|---|---|
| 1224714 | 6/1960 | France | 248/635 |
| 6708633 | 12/1968 | Netherlands | 85/1 JP |

*Primary Examiner*—Wayne L. Shedd
*Attorney, Agent, or Firm*—Daniel G. Blackhurst

[57] ABSTRACT

A strut rod mounting assembly of the type which utilizes a pair of resilient bushings disposed on opposite sides of a vehicle frame member. A terminal end of the strut rod passes through a frame member opening and openings in the bushings with an alignment cup interposed between each bushing and the frame member. Each alignment cup includes a first cylindrical flange closely received in the frame member opening for piloting the cup itself and a second cylindrical flange closely received over an axial portion of the associated bushing outer periphery. This second cylindrical flange acts to pilot the associated bushing and thereby eliminates the need for internal piloting and pivoting means which adds high load forces on the bushing inside diameter, causes bushing pinching and abrading and reduces the mounting assembly overall life.

9 Claims, 3 Drawing Figures

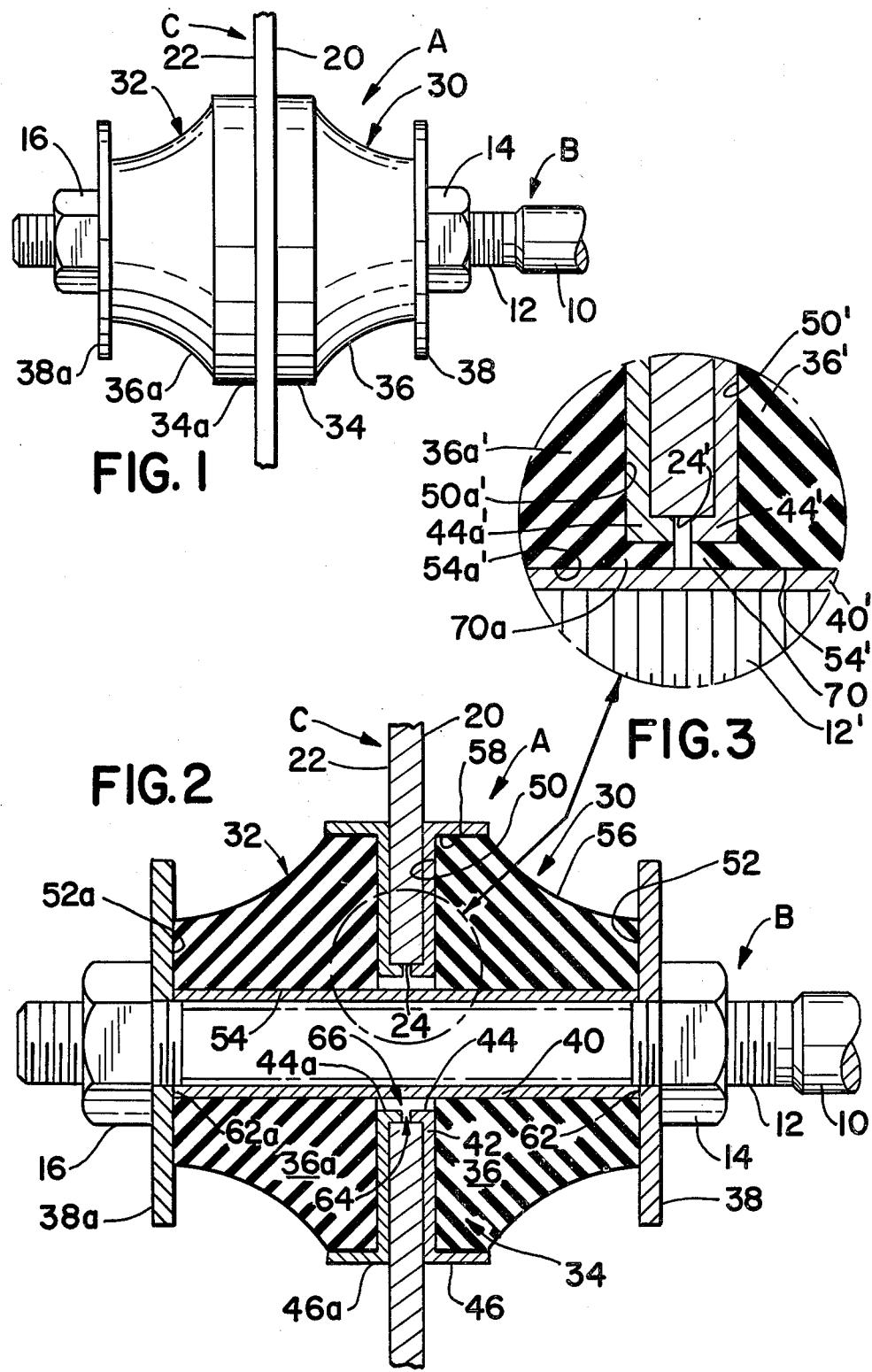

STRUT ROD MOUNTING ASSEMBLY

BACKGROUND OF THE INVENTION

This invention pertains to the art of rod end mounting arrangements and more particularly to such arrangements where the rod may be subjected to rocking and-/or axial forces.

The invention is particularly applicable to mounting assemblies for vehicle suspension system strut rods and will be described with particular reference thereto. However, it will be appreciated that the invention has broader applications and may be adapted to use in other environments.

Vehicle suspension systems utilizing strut rods for supporting, for example, the lower control arms have come to utilize bushing assemblies for yieldably connecting the forward end of the strut rods to a part of the vehicle chassis or frame. These bushing assemblies are designed to be pliable or yieldable to accommodate strut rod pivoting about a point on the frame which is different from the control arm pivot point which is also located on the frame. The pliable nature of the assemblies is necessary to avoid destruction resulting from various forces imposed thereon through the strut rod during vehicle operation.

Typical of prior strut rod mounting assemblies are the ones shown in U.S. Pat. No. 3,552,785 to Elder, et al. Generally, the arrangements shown therein employ a pair of resilient bushings mounted on opposite sides of a vehicle frame member. The bushings include central openings which are aligned with an opening in the frame. A terminal end portion of a strut rod passes through the aligned openings and is connected to the bushing assembly by nuts and washers received at opposite ends of the assembly and which allow each bushing to be slightly compressed at installation. Suitable spacer sleeves are slidably received over the strut rod between the end nuts to insure proper compression of the bushings and to prevent them from engaging the strut rod itself. In addition, each bushing includes a small metal insert molded into the inner end face at generally the radial inner area thereof for providing axially directed pilot flanges. These pilot flanges are adapted to be received in the vehicle frame member opening to act as pilot members for the overall mounting assembly when it is subjected to axial and rocking forces in response to strut rod movement during vehicle operation.

While the general type of strut rod mounting assembly specifically disclosed in prior U. S. Pat. No. 3,552,785 and described above is generally satisfactory, it has a design feature which could potentially cause problems. In particular, the pilot and pivoting portion defined by the small metal insert molded into each bushing could be a cause of premature failure. To explain, during compression and rebound of the suspension system, the strut rod is rocked in the frame member and causes that portion of the bushing closely associated with the metal insert to be constantly pinched and abraided. If the bushings deteriorated from such action, they would no longer properly pilot the strut rod in the frame member opening. This could, in turn, result in undesired and unacceptable front end alignment changes and braking problems.

It has, therefore, been desired to develop a strut rod mounting assembly which would overcome the aforementioned problems and others in order to provide a more reliable strut rod mounting arrangement having a longer effective life for substantially reducing vehicle front end alignment changes and braking problems which could otherwise be caused through improper strut rod support.

BRIEF DESCRIPTION OF THE PRESENT INVENTION

In accordance with the present invention, there is provided a new and improved mounting assembly for connecting the terminal end portion of an elongated strut rod to a vehicle frame member at a predetermined mounting opening passing therethrough. Generally, this mounting assembly includes a pair of resilient bushings which are adapted to be mounted on opposite sides of the vehicle frame member. Each bushing has a central opening extending between opposed inner and outer bushing end faces and is adapted to be placed in alignment with the frame member opening. An alignment cup has a base portion thereof cooperatively disposed between the inner end face of each bushing and the frame member. An inner lip extending generally normal to the alignment cup base is adapted to be axially received in the frame member opening. An outer lip spaced from the inner lip extends outwardly from the base in a direction generally opposite to the inner lip and is adapted to be received over at least a portion of the associated bushing inner end face outer periphery. Suitable spacer means received through the bushing central openings closely surround the associated axial section of the strut rod terminal end to accommodate proper bushing compression and to prevent the bushings from engaging the strut rod. Thrust washers disposed at the bushing outer end faces are adapted to be brought into bearing engagement therewith by selectively adjustable force means. The alignment cup inner lips are advantageously adapted to center and pilot the alignment cups in the frame member opening and the alignment cup outer lips are advantageously adapted to pilot the bushings at least in response to any rocking movement of the strut rod during vehicle operation. This eliminates pinching and abraiding of the bushings as well as high loading forces at or adjacent the bushing inside diameters.

In accordance with another aspect of the present invention, the alignment cup inner and outer lips define generally cylindrical areas. The inside diameter of the cylindrical area defined by the inner lip is greater than the cross-sectional dimension of the associated bushing central opening and the outside diameter thereof is adapted to be closely received in the frame member opening. The inside diameter of the cylindrical area defined by the outer lip is such that the lip closely surrounds an axial portion of the associated bushing from the inner end face thereof.

According to yet another aspect of the present invention, each bushing includes a tab or lip-like area at the inner end face thereof configured to extend axially into the frame member opening radially between the associated alignment cup inner lip and the spacer means.

According to a further aspect of the present invention, there is provided a new and improved pilot member for a strut rod mounting assembly of the type described. This pilot member comprises an alignment cup associated with the inner end face of each bushing and the frame member. The alignment cup has a base interposed between the associated bushing inner face and the frame member, a first cylindrical portion closely received in the frame member opening and a second cylindrical portion which closely surrounds the bushing side wall adjacent the inner end face. The first and second cylindrical portions are spaced from each other along the base and extend outwardly therefrom in generally opposite directions. The first cylindrical portions centers and pilots the alignment cup in the frame member opening while the second cylindrical portion pilots the bushing.

The principal object of the present invention is the provision of a new and improved strut rod mounting assembly of the general type employing a pair of resilient bushing members and which is simple in design, simple to manufacture and easy to install.

Another object of the present invention is the provision of a new and improved strut rod mounting assembly which has a longer effective life and eliminates pinching and abraiding of the bushing members during the application of rocking and/or axial forces thereto.

A further object of the present invention is the provision of a new and improved strut rod mounting assembly wherein the resilient bushing members are piloted from the non-wearing outside periphery thereof to eliminate detrimental high loads being placed on the bushing inside diameters.

Still other objects and advantages for the invention will become apparent to those skilled in the art upon a reading and understanding of the following specification.

BRIEF DESCRIPTION OF THE DRAWINGS

The invention may take physical form in certain parts and arrangements of parts, preferred and alternative embodiments of which will be described in detail in this specification and illustrated in the accompanying drawings which form a part hereof and wherein:

FIG. 1 is a side elevational view of the strut rod mounting assembly which comprises the subject invention as it has been installed for purposes of retaining the outer terminal end of a strut rod in position relative to a vehicle frame member;

FIG. 2 is a longitudinal cross-sectional view of the assembly of FIG. 1; and,

FIG. 3 is an enlarged view of the circled area in FIG. 2 for purposes of showing a modification to the bushing members.

DETAILED DESCRIPTION OF A PREFERRED AND ALTERNATIVE EMBODIMENTS

Referring now to the drawings wherein the showings are for purposes of illustrating the preferred and alternative embodiments of the invention only and not for purposes of limiting same, the Figures show a strut rod mounting assembly A utilized for purposes of mounting the terminal end portion of a strut rod B to a vehicle frame member C.

More particularly, and with reference to FIGS. 1 and 2, strut rod B includes an elongated strut rod body 10 having a threaded terminal end portion 12. A pair of conventional hexagonal nuts 14,16 are threadedly received on terminal end portion 12 for applying opposed compressive loading forces against mounting assembly A as will hereinafter be appreciated. While threaded terminal end portion 12 and nuts 14,16 are conventional and typically used, the subject invention may also be advantageously employed with alternative strut rod terminal end portion configurations and compressive loading means.

Vehicle frame member C includes opposed sides 20,22 having a strut rod receiving opening 24 extending therethrough. In the environment of the subject invention, vehicle frame member C typically comprises a cross frame member with opening 24 being circular and conveniently formed by drilling, stamping or the like. Strut rod B has terminal end portion 12 affixed to this frame member with the other end portion (not shown) extending toward and connected to a vehicle front wheel control arm. Since this latter installation is known in the art and does not itself comprise a part of the present invention, it is not shown or described herein.

With continued reference to both FIGS. 1 and 2, mounting assembly A is comprised of a pair of assembly halves 30,32 which are identical to each other except for being in an opposed end to end relationship on opposite sides of vehicle frame member C. For that reason, detailed description will hereinafter be made with reference to assembly half 30, it being appreciated that assembly half 32 is identical thereto unless otherwise noted. Moreover, the components of assembly half 32 bear like numerals to the corresponding components of assembly half 30 with the inclusion of an "a" suffix. More particularly, assembly half 30 is generally comprised of an alignment cup 34, a bushing or body 36 and a thrust washer 38. Further, an elongated sleeve or spacer means 40 extends through both assembly halves 30,32.

Alignment cup 34 is generally rigid and preferably constructed from metal to include a generally flat annular base 42, a radial inner lip or flange 44 and a radial outer lip or flange 46. Inner lip or flange 44 defines a first cylindrical cup portion and outer lip or flange 46 defines a second cylindrical cup portion. As will be seen in FIG. 2, the inner and outer lips are disposed generally normal to base 42 and extend in opposite directions therefrom. As will also be seen, the first cylindrical portion is adapted to be closely received in frame member opening 24 from side 20.

Bushing or bushing body 36 includes spaced apart inner and outer end faces 50,52 having a cylindrical opening or passage 54 extending therebetween. This opening or passage has a diameter somewhat less than the diameter of opening 24. The bushing or bushing body is advantageously constructed from a pliable or resilient material such as an oil resistant synthetic rubber. The bushing preferably has a somewhat frustoconical outer peripheral side wall or surface 56 converging from adjacent inner end face 50 toward outer end face 52. An axial portion of this outer peripheral surface adjacent inner end face 50 is configured to define a cylindrical band 58. This band has a diameter which facilitates close receipt of the bushing in the alignment cup second cylindrical portion defined by outer lip 46 with bushing inner end face 50 in engagement with alignment cup base 42. Preferably, the axial extent of outer lip or flange 46 is such that the outer terminal end thereof is located at generally the intersection between the bushing cylindrical band 58 and the generally frusto-conical bushing outer side wall 56.

In the preferred arrangement here under discussion, sleeve or spacer means 40 comprises a single elongated metal sleeve closely received over strut rod terminal end portion 12. Cylindrical opening 54 of bushing 36 is, in turn, dimensioned to be closely received over sleeve 40. The length of the sleeve acts to control the amount of compression applied to bushing bodies 36,36a and the sleeve body prevents the bushings from engaging the strut rod. Thrust washer 38 is movable axially of strut rod terminal end portion 12 as nut 14 is threadedly advanced therealong in the prior direction in order to place the washer inner face in compressive bearing engagement with bushing outer end face 52. A similar relationship occurs between the inner end face thrust washer 38a and bushing outer end face 52a as nut 16 is threadedly advanced in the proper direction along terminal end portion 12. Sleeve end faces 62,62a define positive stops for thrust washers 38,38a, respectively.

In the preferred structural arrangement, sleeve 40 has an overall length less than the axial distance between bushing end faces 52,52a when nuts 14,16 are retracted from the positions shown in order that the bushings may freely move to their relaxed conditions due to the inherent characteristics in their construction from pliable or resilient material. In the relaxed condition, there is some axial expansion of the bushings so that end faces 52,52a extend axially beyond sleeve end faces 62,62a respectively. However, and in addition to the single sleeve shown, a number of alternative arrangements could also be advantageously employed without in any way departing from the overall intent or scope of the present invention. For example, a shorter sleeve could be associated with each of bushings 36,36a and dimensioned relative to each other to obtain the same end results described above. In addition, the type of cooperative relationship utilized between the sleeve and thrust washers could be modified as may be desired. These modifications also do not in any way depart from the overall intent or scope of the present invention.

As best shown in FIG. 2, the outermost terminal ends of the first cylindrical portions defined by inner lips 44,44a are spaced apart from each other when mounting assembly A is installed on frame member B so as to define an axial space 64 therebetween. This spacing conveniently allows initial installation of the mounting assembly and subsequent rocking movement of the strut rod therein without interference between the lips. Moreover, the outside diameter of sleeve 40 is less than the inside diameter of the first cylindrical portions defined by alignment cup inner lips 44,44a so that a radial space generally designated 66 is defined therebetween.

With mounting assembly A and strut rod B installed as shown in FIG. 2, any rocking or axial motion of the strut rod relative to vehicle frame member C is primarily transferred to pliable or resilient bushings or bushing bodies 36,36a to thereby cause the bushings to variously compress and rebound in response thereto. The first cylindrical portions defined by alignment cup inner lips 44,44a center and pilot the alignment cups in vehicle frame member opening 24. The second cylindrical portions defined by alignment cup outer lips 46,46a act to pilot bushings 36,36a respectively. Cooperation between these bushings and the associated alignment cups at the bushing cylindrical bands and the alignment cup second cylindrical portions, as well as at the bushing inner end faces and alignment cup bases, is one of a non-wearing relationship during the period of mounting assembly use. Therefore, the bushings are not subjected to pinching and abrading as has heretofore been the case with prior strut rod mounting assemblies of this general type. Moreover, piloting of the bushings from the area of the alignment cup outside diameters, that is, at the alignment cup second cylindrical portions, eliminates high loading forces at or adjacent the bushing inside diameters as has heretofore been the case in prior strut rod mounting assemblies. The advantageous operational results of the construction hereinabove described primarily resides in the fact that it provides for much longer service which, in turn, maintains alignment angles much longer and eliminates related braking problems. The structure of the subject development effectively eliminates internal piloting and pivoting of the bushing members which formed the basis for undesired bushing pinching and abrading.

FIG. 3 shows a slight modification to the bushing or bushing bodies which may also be advantageously employed. In FIG. 3, like components are identified by like numerals with a primed (') suffix and new components are identified by new numerals. In addition, FIG. 3 indicates its relative relationship to FIG. 2 for ease of appreciating this modification.

More particularly, FIG. 3 shows bushings 36',36a' as including annular tab or lip areas 70,70a extending axially outward from inner end faces 50',50a' adjacent cylindrical openings 54',54a'. These lips are dimensioned generally coextensive with alignment cup inner lips or flanges 44',44a' so that the outermost terminal ends of these lip portions are also spaced apart from each other upon mounting assembly installation. This then substantially fills radial space 66 shown in FIG. 2 between alignment cup inner lips 44,44a and the outer wall of sleeve 40. Referring again to FIG. 3, it will be seen that annular lips 70,70a further encapsulate the associated alignment cup and provide additional pliable or yieldable material between the overall mounting assembly and the strut rod terminal end portion. Since, as described hereinabove, piloting of bushings 36',36a' occurs at the outside diameters thereof, no pinching or abrading of lips 70,70a occurs during strut rod rocking.

The invention has been described with reference to the preferred and an alternative embodiment. Obviously, modifications and alterations will occur to others upon the reading and understanding of the specification. It is intended to include all such modifications and alterations insofar as they come within the scope of the appended claims or the equivalents thereof.

Having thus described the invention, it is now claimed:

1. A mounting assembly for connecting a terminal end portion of an elongated strut rod to a vehicle frame member at a predetermined mounting opening passing therethrough, said mounting assembly comprising:
   a pair of resilient bushings each having spaced apart inner and outer end faces with a strut rod receiving passage extending between said end faces, said bushings adapted to be positioned on opposite sides of said frame member with said frame member opening and bushing passages in substantial axial alignment with each other to receive said strut rod terminal end portion therethrough and with said bushing inner end faces disposed adjacent said frame member; an alignment cup having a generally flat base interposed between the inner end face of each bushing and said frame member, each said cup further including an inner lip extending generally normal to said base adapted to be axially received in said frame member opening and an outer lip adapted to be received over at least a portion of the outer periphery of the associated bushing inner end face, said outer lip being spaced along said base from said inner lip and extending outwardly therefrom in a direction generally opposite to said inner lip; spacer means adapted to prevent the side walls of said bushing passages from contacting said strut rod along said terminal end portion thereof; and, a thrust member disposed at each bushing outer end face wherein said thrust members are adapted to be brought into bearing engagement against said bushing body outer end faces by selectively adjustable force means received at spaced apart locations along said strut rod terminal end portion, whereby said inner lips are adapted to center and pilot said alignment cups in said frame member opening and said outer lips are adapted to pilot said bushings at least in response to any rocking movement of said strut rod caused during vehicle operation.

2. The mounting assembly as defined in claim 1 wherein the inner and outer lips of each alignment cup are configured to respectively define generally first and second cylindrical portions extending generally oppositely outward from the alignment cup base, the inside diameter of the first cylindrical portion of each cup being greater than the cross-sectional dimension of the passage extending through the associated one of said bushings.

3. The mounting assembly as defined in claim 2 wherein the first cylindrical portion of each cup is adapted to be closely received in said frame member opening and wherein the inside diameter of the second cylindrical portion of each cup surrounds an axial portion of the associated one of said bushings from the inner end face thereof.

4. The mounting assembly as defined in claim 2 wherein a portion of each bushing at the inner end face thereof extends into said frame member opening intermediate the first cylindrical portion of the associated cup and said spacer means.

5. The mounting assembly as defined in claim 1 wherein said alignment cup inner lips are axially dimensioned so that the outermost terminal ends thereof are adapted to be axially spaced apart from each other when said alignment cups are installed in said frame member opening from the opposite ends thereof.

6. The mounting assembly as defined in claim 1 wherein each bushing body includes a lip-like portion at the inner end face thereof adapted to extend into said frame member opening between the inner lip of the associated alignment cup and said spacer means.

7. In a support assembly for connecting a terminal end portion of a strut rod which passes through a designated opening in a vehicle frame member to said frame member wherein said assembly includes a resilient bushing received over said strut rod terminal end on opposite sides of said frame member with a pilot member interposed between at least a portion of the inner end face of each bushing and said frame member adjacent said frame member opening, spacer means extending through said assembly in a surrounding relationship with an axial portion of said strut rod terminal end portion, and a thrust washer disposed at the outer end face of each bushing urged into compressive bering engagement thereagainst by force means received on said strut rod terminal end portion, the improvement comprising:

each pilot member being comprised of an alignment cup having a generally flat base interposed between the inner end face of the associated bushing and said frame member, an inner flange extending outwardly from and generally normal to said base defining a first cylindrical area dimensioned for close receipt in said frame member opening and an outer flange defining a second cylindrical area having a diameter greater than the diameter of said first cylindrical area and received over an axial portion of the outside periphery of the associated bushing adjacent the inner end face thereof, said outer flange being spaced along said base from said inner flange and extending outwardly therefrom generally opposite to said inner flange, whereby said first cylindrical area centers and pilots said alignment cup in said frame member opening and said second cylindrical area pilots the associated bushing at least in response to any rocking movement of said strut rod caused during vehicle operation.

8. The improvement as defined in claim 7 wherein each bushing includes a lip area extending axially outward from the inner end face thereof radially intermediate said spacer means and the first cylindrical area of the associated alignment cup.

9. The improvement as defined in claim 7 wherein the axial dimensions of said alignment cup first cylindrical areas are such that the outermost terminal ends thereof are spaced apart from each other in said frame member.

* * * * *